(12) United States Patent
Schulz et al.

(10) Patent No.: US 11,322,902 B2
(45) Date of Patent: May 3, 2022

(54) ARRANGEMENT FOR MONITORING AN OPTICAL ELEMENT, LASER SOURCE AND EUV RADIATION GENERATION APPARATUS

(71) Applicant: TRUMPF Lasersystems for Semiconductor Manufacturing GmbH, Ditzingen (DE)

(72) Inventors: Joachim Schulz, Gerlingen (DE); Marc Weber, Ravensburg (DE); Matthias Schmitt, Leonberg (DE)

(73) Assignee: TRUMPF LASERSYSTEMS FOR SEMICONDUCTOR MANUFACTURING GMBH, Ditzingen (DE)

( * ) Notice: Subject to any disclaimer, the term of this patent is extended or adjusted under 35 U.S.C. 154(b) by 0 days.

(21) Appl. No.: 17/381,205

(22) Filed: Jul. 21, 2021

(65) Prior Publication Data

US 2021/0351554 A1  Nov. 11, 2021

Related U.S. Application Data

(63) Continuation of application No. PCT/EP2019/051679, filed on Jan. 24, 2019.

(51) Int. Cl.
*H01S 3/04* (2006.01)
(52) U.S. Cl.
CPC .......... *H01S 3/0401* (2013.01); *H01S 3/0407* (2013.01)
(58) Field of Classification Search
CPC ................................................. H01S 3/04–042
See application file for complete search history.

(56) References Cited

U.S. PATENT DOCUMENTS

| 3,459,942 A | * | 8/1969 | Anderson | ............... H01S 5/042 |
| | | | | 372/38.1 |
| 6,118,527 A | | 9/2000 | Jurca | |
| (Continued) | | | | |

FOREIGN PATENT DOCUMENTS

| CN | 102445314 A | 5/2012 |
| DE | 19839930 C1 | 9/1999 |
| (Continued) | | |

OTHER PUBLICATIONS

Balluff, "Datenblatt BOH TJ-T80-001-01-S49F," *Balluff GmbH*, p. 1, May 24, 2017, Balluff GmbH, Neuhausen, Germany.

*Primary Examiner* — Xinning(Tom) Niu
*Assistant Examiner* — Delma R Forde
(74) *Attorney, Agent, or Firm* — Leydig Voit & Mayer Ltd.

(57) ABSTRACT

An arrangement monitors an optical element. The arrangement includes: a light source configured to emit radiation onto a surface of the optical element; a detector configured to detect the radiation that has been at least partially reflected at the surface of the optical element; and a holder for the optical element, in which the light source and the detector are integrated. The holder has a cooling region through which a cooling liquid is configured to flow, the cooling region being in contact with the optical element. The holder has a reservoir, through which a beam path between the light source and the detector extends. The reservoir is configured to receive the cooling liquid leaking out at the optical element in case of a leakage.

18 Claims, 2 Drawing Sheets

(56) References Cited

U.S. PATENT DOCUMENTS

| | | | |
|---|---|---|---|
| 2004/0114134 A1* | 6/2004 | Fliss | ............... G01N 21/55 |
| | | | 356/239.2 |
| 2010/0135356 A1 | 6/2010 | Schulz | |
| 2013/0258321 A1 | 10/2013 | Jurca | |
| 2016/0353561 A1* | 12/2016 | Enzmann | ............... H05G 2/005 |
| 2018/0231790 A1 | 8/2018 | Hartung et al. | |

FOREIGN PATENT DOCUMENTS

| | | |
|---|---|---|
| DE | 102007030398 A1 | 1/2009 |
| DE | 102008004745 A1 | 7/2009 |
| DE | 102012102785 B3 | 2/2013 |
| EP | 1398612 B1 | 3/2010 |
| WO | WO 2015120889 A1 | 8/2015 |
| WO | WO 2017063686 A1 | 4/2017 |

\* cited by examiner

ARRANGEMENT FOR MONITORING AN OPTICAL ELEMENT, LASER SOURCE AND EUV RADIATION GENERATION APPARATUS

CROSS REFERENCE TO RELATED APPLICATIONS

This application is a continuation of International Application No. PCT/EP2019/051679 (WO 2020/151821 A1), filed on Jan. 24, 2019. The aforementioned application is hereby incorporated by reference herein.

FIELD

The present invention relates to an arrangement for monitoring an optical element. The invention also relates to a laser source and to an extreme ultraviolet (EUV) radiation generating apparatus having such an arrangement.

BACKGROUND

An optical element arrangement is described in EP1398612B1. In such an arrangement, the intensity of the radiation that is reflected at the surface of the optical element and is detected by the detector depends on the surface properties of the optical element. Therefore, the arrangement described there serves for monitoring the functionality of the optical element, in particular to detect damage or aging of the optical element. The wavelength of the radiation emitted by the light source is here selected such that at least some of the emitted radiation is reflected at the surface. The optical element can be arranged in the beam path of a laser beam having a different wavelength than the radiation of the light source. In this way, it is possible to also check optical elements that are transparent for the wavelength of the laser beam with respect to the functionality of the surface thereof.

In addition to a change in the surface properties, it is possible that, in the case of an optical element that is cooled directly with a cooling liquid, for example with water, cooling liquid leaks out into the environment if a fracture or crack is present in the optical element. Some optical elements are mounted in regions in which it is necessary to prevent the exit of a large quantity of cooling liquid. For example, optical elements arranged in a vacuum environment, for example in a laser resonator or in an EUV radiation generating apparatus, are generally subject to stringent requirements in terms of outgassing. Stringent requirements in terms of leakage also apply to optical elements arranged in, or in the vicinity of, a radio-frequency region with high interference fields, as occur for example in a laser resonator of a gas laser. In addition, in such optical elements there is typically the problem that little installation space is available.

WO2017/063686A1 describes a device and a method for protecting a vacuum environment against leakage at an optical component. The device has a detection device for detecting leakage at the optical component in the case of an overflow of a cooling medium from a cooling region into the vacuum environment. The cooling region can form a cavity in a mount of the optical component, which is adjoined by a partial region of the surface of the optical component. If an overflow of the cooling medium from the cooling region into the vacuum environment is detected, a feed line of the cooling medium into the cooling region can be interrupted.

SUMMARY

In an embodiment, the present disclosure provides an arrangement that monitors an optical element. The arrangement includes: a light source configured to emit radiation onto a surface of the optical element; a detector configured to detect the radiation that has been at least partially reflected at the surface of the optical element; and a holder for the optical element, in which the light source and the detector are integrated. The holder has a cooling region through which a cooling liquid is configured to flow, the cooling region being in contact with the optical element. The holder has a reservoir, through which a beam path between the light source and the detector extends. The reservoir is configured to receive the cooling liquid leaking out at the optical element in case of a leakage.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
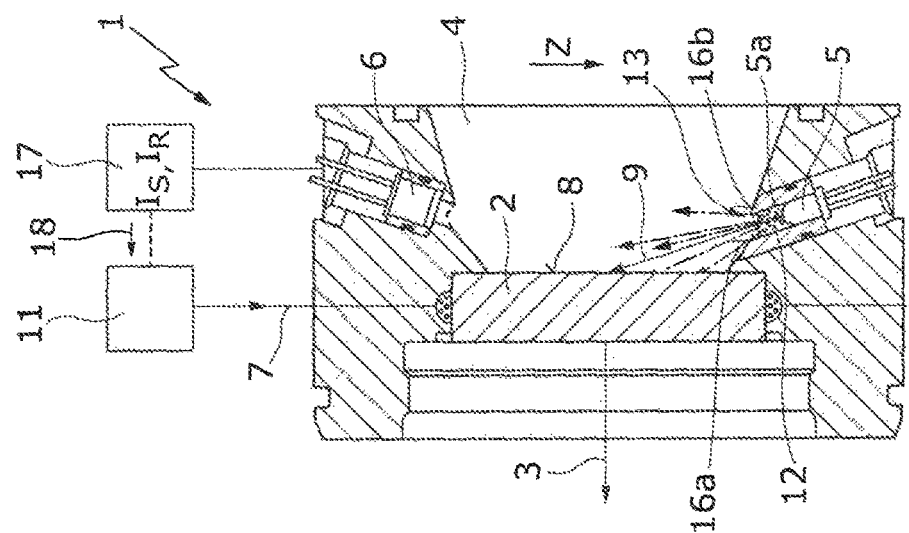
FIGS. 1a-c show three schematic longitudinal sections of an arrangement for monitoring an output coupling mirror of a laser source for leakage.

An embodiment of the present invention provides an arrangement for monitoring an optical element, a laser source and an EUV radiation generating apparatus having at least one such arrangement, which allow efficient monitoring of the optical element for leakage.

One aspect of the invention relates to an arrangement for monitoring an optical element, in which the holder has a cooling region through which a cooling liquid can flow, the cooling region being in contact with the optical element, and in which the holder comprises a reservoir, through which the beam path between the light source and the detector extends, for receiving cooling liquid leaking out at the optical element in case of a leakage.

Embodiments of the present invention monitor the optical element, which is directly cooled with the cooling liquid for a leakage, using the combination of light source and detector which is already present in the arrangement. Such a leakage may occur in the case of a crack in or a fracture of the optical element, in the case of which cooling liquid leaks out from the cooling region at or via the damaged optical element into the environment. For the purposes of monitoring for leakage, a liquid reservoir, through which the beam path between the light source and the detector extends, for receiving a small amount of cooling liquid is attached in the arrangement, typically in the holder.

If the reservoir fills completely or partially with the cooling liquid, the intensity incident on the detector (or, equivalently, the radiant power incident on the detector) changes as compared to the case when no cooling liquid is located in the reservoir. Generally, the intensity of the radiation that is incident on the detector and reflected at the surface decreases owing to the presence of the cooling liquid. The presence of the cooling liquid in the reservoir can effect for example absorption, refraction (change in angle or divergence), scattering, etc. of the radiation emitted by the light source, which is detected using the detector. If a leakage has been detected, a feed line of the cooling medium into the cooling region can be interrupted. Alternatively, the information can be used to differentiate between a real fracture involving leaking out of coolant and other error messages (see below).

In one embodiment, the holder is oriented such that the reservoir is located, in the direction of gravity, below the (monitored) surface of the optical element. The reservoir formed in the holder generally extends in the peripheral direction over a small angle range of less than, for example, +/−30°. In order to position the reservoir below the monitored surface, it is therefore necessary to appropriately orient the holder, that is to say to rotate or orient it along its longitudinal axis, which extends in the horizontal direction, such that the angle range in the peripheral direction at which the reservoir is formed is located below the monitored surface. In the state in which it is oriented in the manner described above, the holder is typically fixed using a fixing device, which forms part of the arrangement or part of an optical system in which the arrangement is mounted.

By arranging the reservoir below the surface, it is possible to ensure that the cooling liquid passes into the reservoir independently of the site on the optical element at which a crack or fracture occurs. The reservoir is typically arranged to be laterally offset in the longitudinal direction in the holder with respect to the optical element or the monitored surface. The upper side of the reservoir is generally located, in the direction of gravity, at a level below the lower edge of the monitored surface. The monitored surface of the optical element is understood to be the exposed part of the surface of the optical element that is not held by the holder.

In a development of this embodiment, an upper edge section of the reservoir that faces the surface is located in the direction of gravity below an upper edge section of the reservoir that is remote from the surface, or vice versa. The upper edge of the reservoir can be configured in this case for example in a stepped manner or be oriented with an inclination at an angle with respect to the horizontal. In both cases, it is possible to counteract an overflow of the reservoir owing to the fact that excess cooling liquid cannot readily flow over the upper edge portion of the reservoir that is remote from the surface and pass into the environment in an undesired fashion. Even if the edge section facing the surface is located above the edge section that is remote from the surface, the volume of the cooling liquid in the reservoir, and thus in the beam path between the light source and the detector, can be limited to a maximum volume or overflowing can be prevented, which makes the detection of a leakage easier.

In a further embodiment, the reservoir is formed in a recess, for example in a hole, in the holder, in which either the light source or the detector is arranged. The holder is here oriented such that either the light source or the detector is arranged in the direction of gravity below the surface to be monitored. A light exit face of the light source or a detector face of the detector typically forms the bottom of the recess or a partial region of the bottom of the recess. In this way, it is ensured that the beam path from the light source to the detector passes through the reservoir. The light source and the detector are typically integrated into the holder using sealing means, for example O-rings, or the like, with the result that no cooling liquid can exit downwardly from the recess. This is particularly advantageous because the light source and the detector typically have electrical contact points at their rear side remote from the recess. The light source can be configured for example as a light-emitting diode or as a laser diode. The detector can be configured for example as a photodiode.

In a further embodiment, the light source is configured and oriented for emitting the radiation onto the surface at an angle of more than 10° (and typically less than 30°) with respect to the direction of gravity and/or the detector is configured or oriented for detecting the radiation that is reflected at the surface at an angle of more than 10° (and typically less than 30°) with respect to the direction of gravity. This is typically achieved by the longitudinal axis of the light source and/or the longitudinal axis of the detector, which typically coincide with the direction in which the radiation exits the light source or with the direction in which the radiation is incident on the detector, being oriented at a corresponding angle of more than 10° with respect to the direction of gravity.

The surface to be monitored can be a planar surface extending in the direction of gravity. In particular in this case, the light source and the detector are typically oriented at the same angle with respect to the surface to be monitored of the optical element. The surface to be monitored can also be a curved surface and/or a surface that is tilted with respect to the direction of gravity. The light source is preferably configured and positioned such that the emitted radiation (without the presence of the cooling liquid in the beam path) is directed at the center on the surface to be monitored of the optical element.

The orientation of the light source or of the detector at an angle with respect to the direction of gravity is advantageous because in this case the radiation emitted by the light source passes, in the case of a leakage, through the horizontally oriented surface of the cooling liquid at a corresponding angle and in the process undergoes refraction, causing a deflection of the radiation exiting the cooling liquid or entering the cooling liquid from a nominal beam direction (without the presence of the cooling liquid). In the case of a sufficiently large deflection angle, the detector therefore detects significantly less radiation than would be the case without the presence of the cooling liquid. A leakage can be identified on the basis of the reduced detected intensity, as will be explained in more detail further below.

If the holder is oriented such that the light source is positioned substantially at the lowest point of the holder, the length of the beam path of the emitted radiation within the recess practically plays no role because the cooling liquid acts in any event as an optical wedge. If the holder is oriented such that the detector is arranged substantially at the lowest point of the holder, it is advantageous if the recess, in which the detector is arranged and which receives the cooling liquid, has a comparatively great length and/or a small width, with the result that the radiation, upon entry in the cooling liquid, is refracted nearly completely toward the lateral edge of the recess and is not incident on the detector.

In a further embodiment, the light source has a (convexly) curved light exit face. This is typically the case if a light source takes the form of a light-emitting diode in which the light exit face is generally spherically curved and acts as a converging lens. If the holder is oriented such that the light source and the recess formed thereabove are located below the surface to be monitored of the optical element, the function of the light exit face as a converging lens is negatively affected by the wetting of the light exit face with the cooling liquid, for example water. If this function is reduced, the radiation emitted by the light source diverges more strongly than would be the case without the presence of the cooling liquid, as a result of which the detected radiation intensity on the detector likewise decreases and, accordingly, a leakage can be detected on the optical element.

In a further embodiment, the light source is configured for emitting radiation in the IR wavelength range. The detector is accordingly adapted and likewise configured for detecting radiation in the IR wavelength range. The radiation emitted by the light source in this case typically has wavelengths or a wavelength in the IR wavelength range of between approximately 1 µm and approximately 2 µm, since a strong absorption band of water is located there, which is typically used in this case as the cooling liquid. Upon passage through the cooling liquid, the radiation of the light source is therefore absorbed, with the result that a leakage can likewise be detected in this way. Such a "light barrier" for identifying water—without reflection or deflection via the surface of an optical element—is commercially available, cf. for example the data sheet of BOH TJ-T80-001-01-S49F by Balluff (www.balluff.com) with a wavelength of the light source at approximately 1480 nm.

In a further embodiment, the holder has a feed contour for feeding the cooling liquid from the optical element into the reservoir. As was described further above, it is advantageous if the holder is oriented such that the reservoir, for example in the form of the recess, is arranged nearly at the lowest point of the holder, with the result that cooling liquid leaking out from the optical element flows into the recess. In order to be able to detect even smallest amounts of leaking out cooling liquid, it is useful if the cooling liquid leaking out at the optical element is guided in a targeted fashion in the direction of the reservoir or is fed to the reservoir. In this way, the reaction time is accelerated and the reliability that the cooling liquid leaking out will not run past the detection reservoir is increased. The feed contour can have a variety of configurations.

In a development of this embodiment, the feed contour is an inclined feed portion extending between an inner edge of the holder, located adjacent to the surface, and the reservoir. The inclined feed portion can be for example a contour extending rotationally symmetrically with respect to a longitudinal axis of the holder, for example a conic or curved face. Alternatively or additionally, it is possible to provide a feed contour in the form of a channel-type depression or the like in the holder, along which the cooling liquid is guided from the optical element in the direction of the reservoir. The feed contour can have at the inner edge of the holder, located adjacent to the surface, a comparatively large width which decreases in the direction of the reservoir so as to guide, if possible, all of the cooling liquid leaking out from the optical element into the reservoir.

In a further embodiment, the arrangement has a feed device for feeding the cooling liquid to the cooling region, which typically forms a cavity in the holder. The feed device typically has a feed line that opens into the cooling region within the holder via an entrance opening in the holder. The feeding and discharging of the cooling liquid can be effected for example in the manner described in WO2017/063686A, which was cited above and is made content of this application in its entirety by way of reference.

The cooling region can form for example an annular cavity in the holder that surrounds the optical element and is in contact with the optical element for example at the peripheral side face thereof. The cooling region typically has an exit opening for discharging the cooling liquid from the cooling region. The cooling liquid can be fed via the exit opening to a cooling device by way of a discharge line, with the cooling device outputting the heat absorbed by the cooling liquid to the environment or to another medium. The cooling device, the feed line and the discharge line can form a closed cooling circuit. Alternatively, the heated cooling liquid can be discharged to the environment—for example when cooling water is used.

In a further embodiment, the arrangement has an evaluation device (evaluator) for comparing the intensity of the radiation detected by the detector to a reference intensity, wherein the evaluation device is preferably configured for outputting an error signal and/or outputting a control signal for deactivating the feed device if the intensity of the radiation detected by the detector deviates from the reference intensity by a specified value (threshold value). The evaluation device may be for example a microprocessor or the like. As is described in EP1398612B1, which was cited in the introductory part and is made content of this application in its entirety by way of reference, the intensity of the detected radiation is compared to a reference intensity stored in the evaluation device. If the intensity of the radiation detected by the detector deviates from the reference intensity by the specified value, the deviation can be attributed to damage to or aging of the surface, as is described in EP1398512B1, or to the presence of a leakage, as is described further above.

It is not absolutely necessary for the two cases to be distinguished from one another, because an error is present in both cases. If a distinction is to be made between the two error cases, it is possible to specify for both cases in each case different threshold values which result in the outputting of a respectively different error signal and/or control signal. Alternatively or in addition thereto, the development of the intensity detected by the detector over time can be used for making the distinction: A change in the surface properties typically occurs over a comparatively long timescale, while a leakage results in a decrease of the detected intensity in a relatively short period of time.

The fact that the surface of the cooling liquid located in the reservoir is typically not calm and smooth but fluctuates over time practically has no effect on the detection: The evaluation of the detected intensity by way of the evaluation device can take into consideration short-term fluctuations and very brief deviations in the intensity from the reference value by the specified value.

The evaluation device can output an error signal to indicate to an operator that manual separation of the cooling region from the cooling device or from the feed device (and switching off of the laser or of the laser beam) is required. Alternatively, an automated separation can be performed by way of the evaluation device outputting a control signal that is fed to the feed device for the purpose of deactivating it. The manner of deactivation can be for example such that a feed line of the feed device is closed, for example by closing a controllable valve that is provided for this purpose and is switched into a suitable switching position by way of the control signal. If a leakage is present, the evaluation device typically also outputs a control signal for switching off the (laser) radiation source.

The arrangement described here typically also comprises the optical element, the surface of which is monitored and which is typically held in the holder by way of its lateral edge. The optical element or the substrate material thereof can be formed for example from zinc selenide (ZnS), gallium arsenide (GaAs) or diamond. The arrangement is typically mounted in an optical system, wherein in particular the holder in the mounted state is oriented such that the reservoir is located in the direction of gravity below the surface to be monitored of the optical element (see above).

The holder can here be fixed in its orientation by way of a fixing device, for example using fixing screws. The surface to be monitored of the optical element is here typically oriented substantially parallel to the direction of gravity, although this is not absolutely necessary.

A further aspect of the invention relates to a laser source, in particular a $CO_2$ laser source, comprising an arrangement as described further above for monitoring an optical element, in particular an output coupling mirror or an output coupling window of the laser source. The arrangement can serve for monitoring a surface of the output coupling mirror or window that faces an inner side of a laser resonator of the laser source. The arrangement can also serve for monitoring an outer side of the output coupling mirror or window that is remote from the laser resonator, as is described in EP139612B1, which was cited in the introductory part.

One aspect of the invention relates to an EUV radiation generating apparatus having an arrangement as described further above for monitoring an optical element. The optical element can be an optical element of a laser source, for example the output coupling mirror which is described further above or an output coupling window of the laser source. The optical element can also be arranged outside the laser source. For example, the optical element can be a window of an optical amplifier that forms part of a driver laser arrangement of the EUV radiation generating apparatus. An optical element of an EUV radiation generating apparatus configured for separating a vacuum environment from a beam guidance for feeding a laser beam into the vacuum environment, as is described in WO2017/063686A1, which was cited in the introductory part, can also be monitored by way of the arrangement described further above.

In all the examples described further above, monitoring of the optical element for leakage can be effected without additional components such as a water sensor, with the result that the leakage monitoring can be performed cost-effectively. Additionally, practically no additional installation space is required for leakage monitoring.

Further advantages of the invention are apparent from the description and the drawing. The aforementioned features and the features mentioned further below can likewise be employed in each case by themselves or in any desired combination. The embodiments shown and described should not be understood to be an exhaustive list, but rather have an exemplary character for the purpose of illustrating the invention.

In the following description of the drawings, identical reference signs are used for the same components or for components having the same function.

Figure 1B:
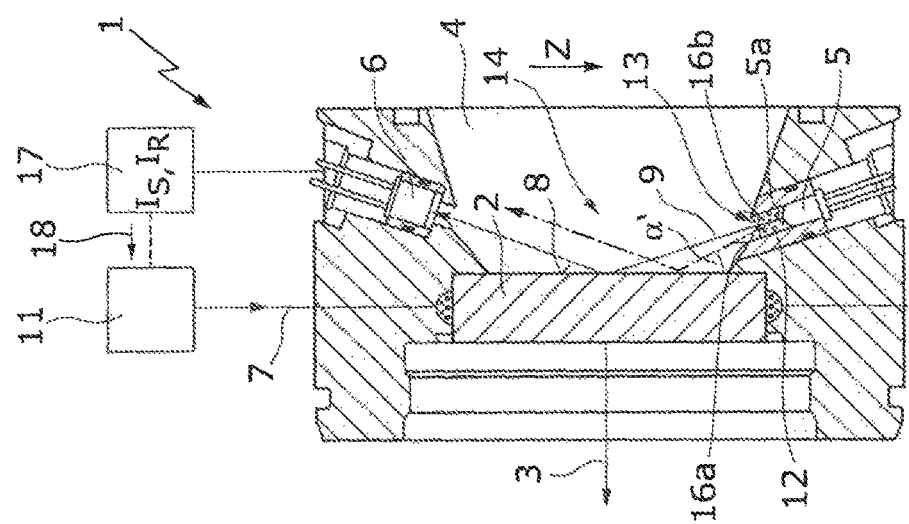
Figure 1C:
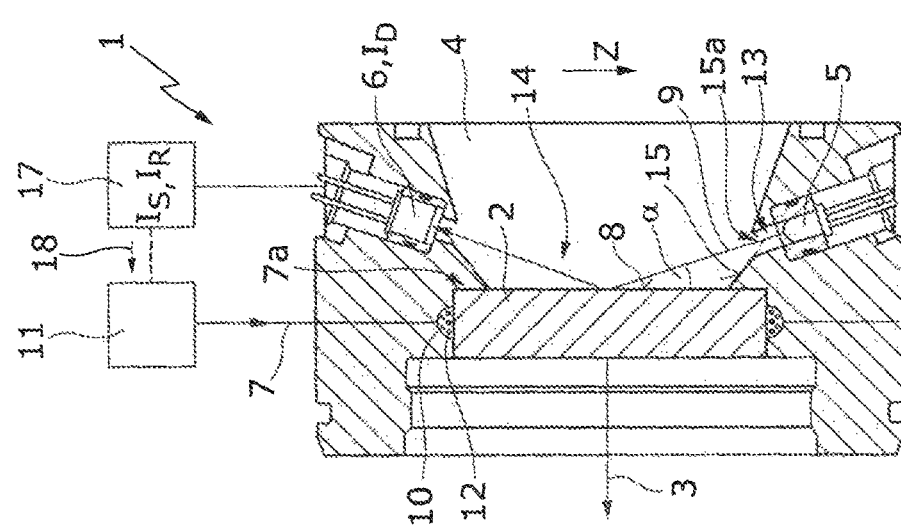

FIGS. 1a-c show an arrangement 1 for monitoring an optical element in the form of an output coupling mirror 2 of a laser source for functionality and for possible leakage. The partially transmissive output coupling mirror 2 is used to couple a laser beam 3 out of a laser resonator 4 of the laser source. As an alternative to the output coupling mirror 2 described here, the optical element that is to be monitored may also be a (partially) transmissive output coupling window of the laser resonator 4.

The arrangement 1 comprises a light source 5, configured in the example shown in the form of a light-emitting diode, and a detector 6, configured in the example shown in the form of a photodiode, which are both integrated on the side of the output coupling mirror 2 that faces the laser resonator 4 into a holder 7 of the output coupling mirror 2. The light source 5 and the detector 6 are located here diametrically opposite one another with respect to the output coupling mirror 2 and are oriented at the same angle $\alpha$ relative to a plane reflective surface 8 of the output coupling mirror 2 that faces the laser resonator 4 and offset laterally in the longitudinal direction of the holder 7 relative to the output coupling mirror 2. The light-emitting diode 5 and the photodiode 6 at the same time form a termination of the resonator-internal vacuum with respect to the atmosphere.

The radiation 9 emitted by the light source 5 with a reference intensity IR is directed at the center on the surface 8 of the output coupling mirror 2. The light source 5 is designed for emitting the radiation 9 at an angle $\alpha$ of more than 10° and of less than 30°, in the example shown of 20°, relative to the surface of the output coupling mirror 2 or is arranged at such an angle $\alpha$ relative to the surface 8 of the output coupling mirror 2. The detector 6 is appropriately designed and oriented to detect the radiation 9, reflected by the surface 8 onto the detector 6 located opposite thereto, with a radiation intensity ID.

The holder 7 of the arrangement 1 has a cooling region 10, which is an annular cavity extending along a circular peripheral face of the output coupling mirror 2. A feed device 11 serves for feeding a cooling liquid 12 into the cooling region 10 via an entry opening formed in the holder 7. The cooling liquid 12 in the cooling region 10 is in direct contact with the output coupling mirror 2 so as to cool the latter. An exit opening, via which the heated cooling liquid leaves the holder 7 and is discharged via a discharge line, is formed on the diametrically opposite side of the annular cooling region 10.

The holder 7 is arranged such that the surface 8 to be monitored of the output coupling mirror 2 is oriented in the direction of gravity Z, that is to say vertically. The holder 7 is additionally oriented, i.e. rotated about its longitudinal axis (which extends horizontally), such that the light source 5 and the detector 6 are positioned one above the other in the direction of gravity Z. Accordingly, both the light source 5 and the detector 6 are oriented in the example shown at an angle $\alpha$ of 20° relative to the direction of gravity Z. In the case of the orientation of the holder 7 as shown, the light source 5 is arranged, in the direction of gravity Z, below the exposed surface 8 of the output coupling mirror 2, that is to say below the part of the surface 8 that is not held in the holder 7. Accordingly, a recess 13 in the form of a hole in the holder 7, at the bottom of which the light source 5 is arranged, is also arranged below the exposed surface 8 of the output coupling mirror 2.

If there is a crack or a fracture in the output coupling mirror 2, cooling liquid 12 can enter the laser resonator 4 via the output coupling mirror 2. To detect such leakage as quickly as possible, the recess 13 arranged below the surface 8 can serve as a reservoir for receiving the leaking out cooling liquid 12, as is illustrated in FIGS. 1b and 1n FIG. 1c. The beam path 14 of the radiation 9 between the light source 5 and the detector 6 here passes through the recess 13. The recess 13 is likewise oriented at an angle with respect to the surface 8 of the output coupling mirror 2, specifically at the angle $\alpha$ of 20°. The holder 7 has a conically extending inner contour 15, which extends from an inner edge 7a of the holder 7, which is located adjacent to the surface 8 and forms a minimum inner diameter of the holder 7, in the longitudinal direction of the holder 7 to the recess 13. The conic inner contour 15 forms a feed contour in the form of an inclined feed portion for feeding the cooling liquid 12 leaking out at the output coupling mirror 2 to the recess 13. The inclined feed portion 15, which extends conically or possibly in a rounded manner, may also extend in the longitudinal direction only over a partial region of the holder 7 between the inner edge 7a and the recess 13.

The upper edge of the recess 13, which adjoins the inclined feed portion 15, correspondingly extends at an angle with respect to the horizontal and has a first edge section 16a, which faces the surface 8 of the output coupling mirror 2 and via which the cooling liquid 12 enters the recess 13. The reservoir 13 also has a second edge section 16b, which is remote from the surface 8 of the output coupling mirror in the longitudinal direction, is located in the direction of gravity Z above the first edge section 16a and in this way counteracts the leaking of excess cooling liquid 12 from the reservoir 13 into a region of the holder 7 that is remote from the surface 8, that is to say the upper edge of the reservoir 13 is stepped. A further conically extending face adjoins the second edge section 16b in the longitudinal direction. As is illustrated by dashes in FIG. 1a-c, the holder 7 has between the two upper edge sections 16a,b a channel-type depression 15a, which extends around in the peripheral direction and likewise forms a feed contour for feeding the cooling liquid 12 to the reservoir 13 in the peripheral direction.

As can be seen in FIG. 1b, the inclined hole or recess 13, which is filled with the cooling liquid 12 and through which the radiation 9 of the light source 5 passes, has a wedge shape. The radiation 9 emitted by the light source 5 is therefore incident on the surface of the cooling liquid 12 at an angle $\alpha$ of 20° with respect to the normal direction. At the surface of the cooling liquid 12, the radiation 9 enters the vacuum environment within the laser resonator 4 and is refracted here at the surface of the cooling liquid 12. If the cooling liquid 12 is water, as in the present example, having a refractive index n of approximately 1.33, the radiation 9 is deflected by approximately 7° upon passage through the surface of the cooling liquid 12, that is to say the radiation is incident on the surface 8 of the output coupling mirror 2 at an angle $\alpha'$ of approximately 13°. On account of this deflection, the intensity ID detected by the detector 6 is significantly reduced as compared to the case without the presence of the cooling liquid 12 in the recess 13.

As can be seen in FIG. 1c, the light source in the form of the light-emitting diode 5 has a spherically curved light exit face 5a functioning as a converging lens. If the cooling liquid 12 is present in the cutout 13, the light exit face 5a is wetted by the cooling liquid 12, which reduces the effect of the light exit face 5a as a converging lens. Therefore, the effect illustrated in FIG. 1c, that the radiation 9 exits the light-emitting diode 5 divergently, occurs, which likewise reduces the intensity ID detected by the detector 6.

If the cooling liquid 12 is present in the recess 13, the intensity ID of the radiation 9 detected by the detector 6 can furthermore be reduced due to the fact that the light source 5 emits the radiation 9 at a wavelength in which an absorption band of the cooling liquid 12 is located. For example, the light source 5 can be configured to emit the radiation 9 in the IR wavelength range between approximately 1 µm and approximately 2 µm. Upon passage through the cooling liquid 12, some of the radiation 9 is in this case absorbed in the cooling liquid, with the result that the intensity ID of the radiation 9 detected at the detector 6 is likewise reduced. Alternatively, the light source 5 can be configured to emit radiation 9 in the visible or in another wavelength range.

The intensity ID of the reflected radiation 9 measured at the detector 6 depends not only on the presence or absence of the cooling liquid 12 in the reservoir 13, but also on the nature of the surface 8, and is consequently a measure of any damage to and aging of the surface 8 of the output coupling mirror 2. The radiation intensity ID detected by the detector 6 is fed to an evaluation device 17, for example a microprocessor, to compare the detected light intensity ID to a stored reference intensity IR. The reference intensity IR used can be, for example, the light intensity ID that is measured with an as new output coupling mirror 2 (without leakage). If the light intensity ID measured by the detector 6 deviates from the stored reference intensity Is by a specified, defined value Is (threshold value), the evaluation device 17 outputs an error message or an error signal, switches off the laser, and deactivates the feed device 11 to prevent cooling liquid 12 from being fed further into the cooling region. For this purpose, the evaluation device 17 outputs a control signal 18, which acts on a controllable valve, to the feed device 11. If a distinction is to be made between the presence of a leakage or aging of the output coupling mirror 2, two different threshold values Is may be used in the evaluation device 17.

In addition or alternatively to the monitoring shown in FIG. 1a-c of the surface 8 of the output coupling mirror 2 facing the laser resonator 4, it is also possible to monitor the surface of the output coupling mirror 2 that is remote from the laser resonator 4 in the manner described further above.

Figure 2:
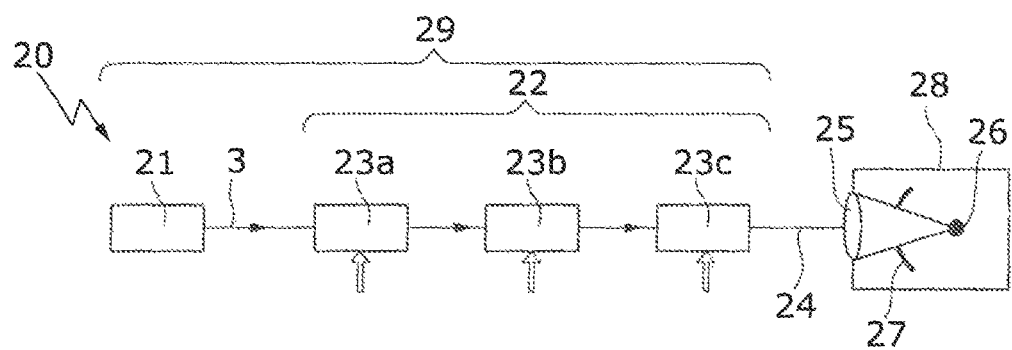
FIG. 2 shows a schematic illustration of an EUV radiation generating apparatus having such a laser source.

The arrangement 1 having the laser resonator 4 shown in FIG. 1a-c can be used for example as a $CO_2$ laser source 21 in an EUV radiation generating apparatus 20, as is illustrated in FIG. 2. The EUV radiation generating apparatus 20 comprises, in addition to the laser source 21, an amplifier arrangement 22 having three optical amplifiers or amplifier stages 23a-c, a beam guiding device 24, and a focusing device 25. The focusing device 25 serves for focusing the laser beam 3, which is produced by the laser source 21, is amplified by the amplifier arrangement 22, and exits at the output coupling mirror 2 shown in FIG. 1a-c, at a target region in a vacuum chamber 28, in which a target material 26 is introduced. Upon irradiation with the laser beam 3, the target material 26 transitions into a plasma state and here emits EUV radiation, which is focused using a collector mirror 27. The laser source 21 forms, together with the amplifier arrangement 22, a driver laser arrangement 29 of the EUV radiation generating apparatus 20. The arrangement 1 shown in FIG. 1a-c can also serve for monitoring optical elements of the EUV radiation generating apparatus 20 that are arranged outside the laser source 21, for example for monitoring (output coupling) windows of the amplifier stages 23a-c or for monitoring the focusing device 25 or possibly a window that separates the beam guidance device 24 from the vacuum chamber 28.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An arrangement for monitoring an optical element, the arrangement comprising:
   a light source configured to emit radiation onto a surface of the optical element;
   a detector configured to detect the radiation that has been at least partially reflected at the surface of the optical element; and
   a holder for the optical element, in which the light source and the detector are integrated,
   wherein:
      the holder has a cooling region through which a cooling liquid is configured to flow, the cooling region being in contact with the optical element, and
      the holder comprises a reservoir, through which a beam path between the light source and the detector extends, the reservoir being configured to receive and hold the cooling liquid leaking out at the optical element in case of a leakage.

2. The arrangement as claimed in claim 1, wherein the holder is oriented such that the reservoir is located in a direction of gravity below the surface of the optical element.

3. The arrangement as claimed in claim 2, wherein an upper edge section of the reservoir that faces the surface is located in the direction of gravity below another upper edge section of the reservoir that is remote from the surface, or vice versa.

4. The arrangement as claimed in claim 1, wherein the reservoir forms a recess in the holder, in the recess either the light source or the detector is arranged.

5. The arrangement as claimed in claim 1, wherein the light source is configured to emit the radiation onto the surface at an angle of more than 10° with respect to a direction of gravity or the detector is configured to detect the radiation that is reflected at the surface at an angle of more than 10° with respect to the direction of gravity.

6. The arrangement as claimed in claim 1, wherein the light source has a curved light exit face.

7. The arrangement as claimed in claim 1, wherein the light source is configured to emit radiation in an infrared wavelength range.

8. The arrangement as claimed in claim 1, wherein the holder has a feed contour configured to feed the cooling liquid from the optical element into the reservoir.

9. The arrangement as claimed in claim 8, wherein the feed contour comprises an inclined feed portion extending between an inner edge of the holder, located adjacent to the surface, and the reservoir.

10. The arrangement as claimed in claim 1, further comprising: a feed device configured to feed the cooling liquid to the cooling region.

11. The arrangement as claimed in claim 1, further comprising: an evaluator configured to compare an intensity of the radiation detected by the detector to a reference intensity, wherein the evaluation device is configured for outputting an error signal and/or outputting a control signal for deactivating the feed device upon determining that the intensity of the radiation detected by the detector deviates from the reference intensity by a specified value.

12. A laser source, the laser source comprising: the arrangement as claimed in claim 1 for monitoring the optical element of the laser source.

13. An extreme ultraviolet (EUV) radiation generating apparatus, the EUV radiation generating apparatus comprising: the arrangement as claimed in claim 1 for monitoring the optical element.

14. A method for monitoring an optical element, the method comprising:
   emit, using a light source, radiation onto a surface of the optical element, wherein the optical element is in contact with a cooling region through which a cooling liquid is configured to flow;
   detecting, using a detector, the radiation that has been at least partially reflected at the surface of the optical element, wherein the light source and the detector are integrated in a holder that comprises a reservoir through which a beam path between the light source and the detector extends, the reservoir being configured to receive and hold the cooling liquid leaking out at the optical element in case of a leakage; and
   comparing, using an evaluator, an intensity of the radiation detected by the detector to a reference intensity to detect the presence of the leakage.

15. The method as claimed in claim 14, wherein the cooling liquid is fed through the cooling region by a feed device, and the method further comprising:
   outputting an error signal and/or outputting a control signal for deactivating the feed device upon determining that the intensity of the radiation detected by the detector deviates from the reference intensity by a specified value.

16. The method as claimed in claim 14, further comprising:
   determining, using the evaluator, the presence of the leakage upon determining that a difference between the reference intensity and the intensity of the radiation detected by the detector exceeds a threshold value.

17. The method as claimed in claim 14, further comprising:
   distinguishing, using the evaluator, the presence of the leakage and a change of surface properties of the optical element based on whether a difference between the reference intensity and the intensity of the radiation detected by the detector exceeds a first threshold value or a second threshold value different from the first threshold value.

18. The method as claimed in claim 14, further comprising:
   monitoring the intensity of the radiation detected by the detector over time; and
   distinguishing, using the evaluator, the presence of the leakage and a change of surface properties of the optical element based on a difference between the reference intensity and the intensity of the radiation detected by the detector as a function of time.

* * * * *